United States Patent
Bhandari et al.

(10) Patent No.: US 10,956,592 B2
(45) Date of Patent: Mar. 23, 2021

(54) CONTENTS SECURING METHOD AND ELECTRONIC DEVICE SUPPORTING THE SAME

(71) Applicant: Samsung Electronics Co., Ltd., Suwon-si (KR)

(72) Inventors: Ankit Bhandari, Suwon-si (KR); Jong Hyuk Jang, Suwon-si (KR); Jae Woong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 15/797,395

(22) Filed: Oct. 30, 2017

(65) Prior Publication Data

US 2018/0121671 A1 May 3, 2018

(30) Foreign Application Priority Data

Oct. 28, 2016 (KR) .................. 10-2016-0142396

(51) Int. Cl.
*G06F 21/62* (2013.01)
*G06F 21/36* (2013.01)
(Continued)

(52) U.S. Cl.
CPC ........ *G06F 21/6218* (2013.01); *G06F 3/0482* (2013.01); *G06F 3/04883* (2013.01); *G06F 16/1774* (2019.01); *G06F 16/58* (2019.01); *G06F 21/36* (2013.01); *G06F 16/16* (2019.01); *G06F 21/31* (2013.01);
(Continued)

(58) Field of Classification Search
CPC .. G06F 21/6218; G06F 16/1774; G06F 16/58; G06F 3/0482; G06F 3/04883; G06F 21/36; G06F 16/16; G06F 21/31; H04W 12/00502; H04W 12/00503; H04W 12/06; H04W 12/08; H04W 88/02

See application file for complete search history.

(56) References Cited

U.S. PATENT DOCUMENTS 7,689,457 B2 3/2010 Chan et al.
7,743,059 B2 6/2010 Chan et al.
(Continued)

FOREIGN PATENT DOCUMENTS

EP     2 618 247 A1    7/2013
WO   2016/094202 A1   6/2016

OTHER PUBLICATIONS

Extended European Search Report dated Jul. 4, 2019, issued in European Application No. 17865677.3.

*Primary Examiner* — Catherine Thiaw
(74) *Attorney, Agent, or Firm* — Jefferson IP Law, LLP

(57) ABSTRACT

An electronic device is provided. The electronic device includes a memory configured to store contents, a display configured to output the contents, and a processor operatively connected with the memory and the display. The memory is further configured to store instructions that, when executed, cause the processor to, in response to a first user input, select at least one contents satisfying a specified condition among a plurality of contents stored in the memory, output a first screen composed of the selected at least one contents in the display, and if a second user input to end the output of the first screen is received, output a second screen for verification of a user of the electronic device in the display.

13 Claims, 9 Drawing Sheets

(51) Int. Cl.
*H04W 12/06* (2021.01)
*H04W 12/08* (2021.01)
*G06F 3/0482* (2013.01)
*G06F 3/0488* (2013.01)
*G06F 16/176* (2019.01)
*G06F 16/58* (2019.01)
*G06F 16/16* (2019.01)
*G06F 21/31* (2013.01)
*H04W 88/02* (2009.01)
*H04W 12/00* (2021.01)

(52) U.S. Cl.
CPC ............... *H04W 12/00502* (2019.01); *H04W 12/00503* (2019.01); *H04W 12/06* (2013.01); *H04W 12/08* (2013.01); *H04W 88/02* (2013.01)

(56) References Cited

U.S. PATENT DOCUMENTS

| | | | |
|---|---|---|---|
| 7,966,225 | B2 | 6/2011 | Chan et al. |
| 8,095,521 | B2 | 1/2012 | Chan et al. |
| 8,261,361 | B2 | 9/2012 | Liu et al. |
| 8,560,545 | B2 | 10/2013 | Chan et al. |
| 9,904,864 | B2 | 2/2018 | Lee |
| 2008/0243637 | A1 | 10/2008 | Chan et al. |
| 2008/0243638 | A1 | 10/2008 | Chan et al. |
| 2008/0243815 | A1 | 10/2008 | Chan et al. |
| 2008/0243817 | A1 | 10/2008 | Chan et al. |
| 2010/0235881 | A1 | 9/2010 | Liu et al. |
| 2012/0109778 | A1 | 5/2012 | Chan et al. |
| 2012/0154413 | A1* | 6/2012 | Kim ............... G06F 21/71 345/530 |
| 2012/0299847 | A1 | 11/2012 | Kwon et al. |
| 2013/0047238 | A1* | 2/2013 | Hwang ............... H04L 9/3228 726/7 |
| 2013/0069962 | A1 | 3/2013 | Nealer et al. |
| 2014/0283128 | A1 | 9/2014 | Shepherd et al. |
| 2014/0283135 | A1 | 9/2014 | Shepherd et al. |
| 2014/0283141 | A1 | 9/2014 | Shepherd et al. |
| 2014/0283142 | A1* | 9/2014 | Shepherd ............... H04M 1/673 726/30 |
| 2014/0344922 | A1* | 11/2014 | Lam ............... H04W 12/0806 726/19 |
| 2014/0379749 | A1* | 12/2014 | Yim ............... G06Q 10/10 707/769 |
| 2015/0047020 | A1 | 2/2015 | Kim et al. |
| 2015/0121516 | A1* | 4/2015 | Korkishko ............... G06F 21/31 726/19 |
| 2015/0212681 | A1* | 7/2015 | Shinozaki ............... G09G 5/00 345/8 |
| 2016/0092750 | A1 | 3/2016 | Lee |
| 2016/0364564 | A1* | 12/2016 | Lee ............... G06F 21/36 |
| 2017/0366862 | A1 | 12/2017 | Ash et al. |
| 2019/0272070 | A1* | 9/2019 | Shan ............... G06F 3/04817 |

\* cited by examiner

CONTENTS SECURING METHOD AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Oct. 28, 2016 in the Korean Intellectual Property Office and assigned Serial number 10-2016-0142396, the entire disclosure of which is hereby incorporated by reference.

TECHNICAL FIELD

The present disclosure relates to a contents securing method and an electronic device supporting the same.

BACKGROUND

An electronic device such as a smartphone or the like may provide an execution environment of an application supporting various functions. For example, the electronic device may control system resources, such as a storage space of a memory and the like, such that applications supporting functions, such as a function of managing contacts, a function of managing an album of photos and videos, and the like, are installed and executed.

Meanwhile, the electronic device may support various ways to secure contents stored in a memory. For example, the electronic device may encrypt contents to be secured or may independently store contents in a separate storage area such that an unauthorized user or an external electronic device fails to use the contents.

The above information is presented as background information only to assist with an understanding of the present disclosure. No determination has been made, and no assertion is made, as to whether any of the above might be applicable as prior art with regard to the present disclosure.

SUMMARY

However, in the case of encrypting contents or storing the contents in a separate storage area, any other application installed in the electronic device may fail to access the contents. For this reason, even in the case where an authorized user utilizes the other application, the use of the contents may be limited, thereby causing inconvenience.

Aspects of the present disclosure are to address at least the above-mentioned problems and/or disadvantages and to provide at least the advantages described below. Accordingly, an aspect of the present disclosure is to provide a contents securing method, which selects at least one contents satisfying a specified condition among contents stored in a memory, outputs a screen composed of only the selected contents, and outputs a screen needing user verification if an input to end the screen is received and an electronic device supporting the same.

In accordance with an aspect of the present disclosure, an electronic device is provided. The electronic device includes a memory configured to store contents, a display configured to output the contents, and a processor operatively connected with the memory and the display. The memory is further configured to store instructions that, when executed, cause the processor to, in response to a first user input, select at least one contents satisfying a specified condition among a plurality of contents stored in the memory, output a first screen composed of the selected at least one contents in the display, and if a second user input to end the output of the first screen is received, output a second screen for verification of a user of the electronic device in the display.

In accordance with another aspect of the present disclosure, an electronic device is provided. The electronic device includes a memory configured to store contents, a display configured to output the contents, and a processor operatively connected with the memory and the display. The memory is further configured to store instructions that, when executed, cause the processor to, in response to a first user input, output a first screen composed of a plurality of contents stored in the memory, in response to a second user input, select at least one contents among the plurality of contents, output a second screen composed of the selected at least one contents in the display, and if a third user input to end the output of the second screen is received, output a third screen for verification of a user of the electronic device in the display.

In accordance with another aspect of the present disclosure, a contents securing method of an electronic device is provided. The method includes, in response to the first user input, obtaining a first user input, selecting at least one contents among a plurality of contents stored in a memory of the electronic device, outputting a first screen composed of the selected at least one content in a display of the electronic device, and outputting a second screen for verification of a user of the electronic device in the display if a second user input to end the output of the first screen is received.

According to embodiments of the present disclosure, any other person may view only selected contents by outputting a screen composed of only the selected contents and outputting a screen needing user verification if an input to end the screen is received.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
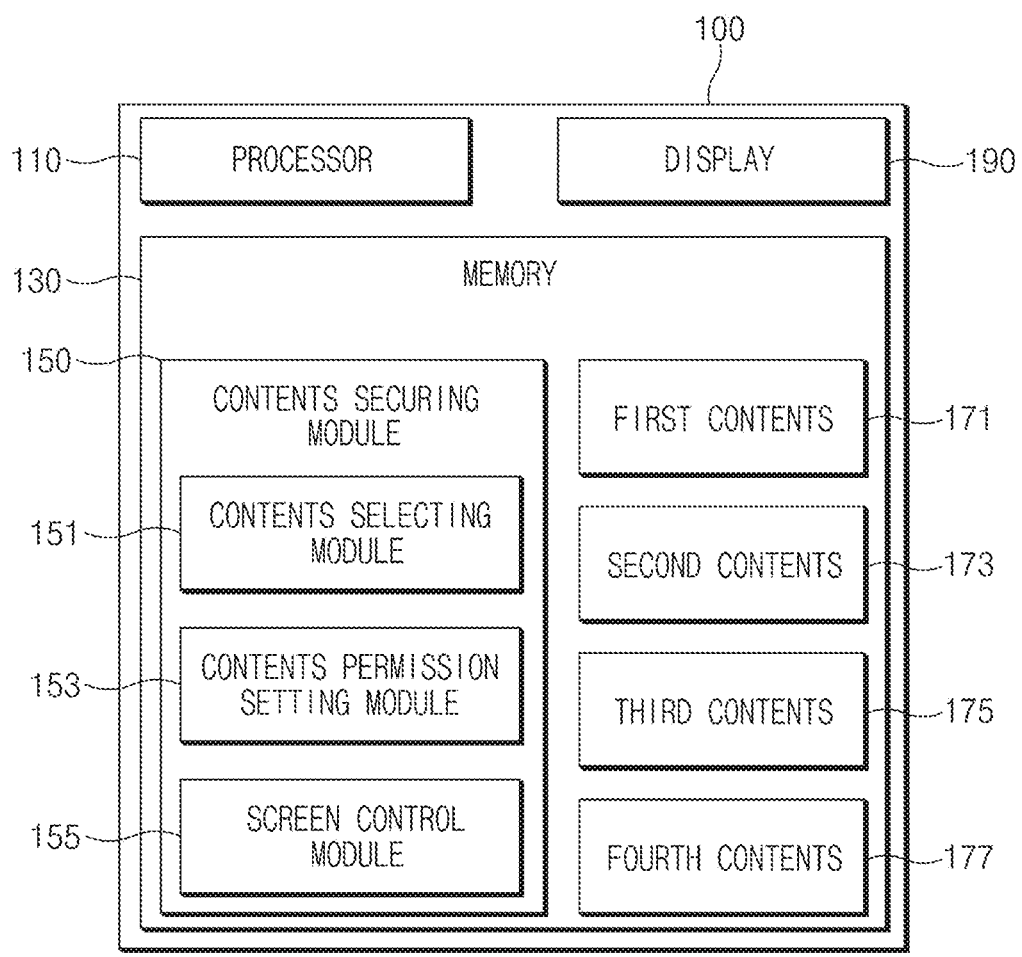
FIG. 1 is a block diagram of an electronic device associated with contents securing according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiment described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general-purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device is provided. The electronic device includes at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a block diagram of an electronic device associated with contents securing according to an embodiment of the present disclosure.

An electronic device 100 may support a function of securing contents stored in a memory 130. For example, in the case where a user of the electronic device 100 lets any other person see a part of the contents stored in the memory 130, to prevent critical information such as personal information from being exposed, the electronic device 100 may output a screen composed of only contents satisfying a specified condition or only contents selected by the user, in a display 190. Also, if an input to end a screen composed of only the selected contents, for example, an input to select a home button, a back button, a power button, or the like is received, the electronic device 100 may output a screen needing verification of the user, for example, a lock screen or the like in the display 190. For this reason, any other person except for the user of the electronic device 100 may fail to view any other contents stored in the memory 130.

Referring to FIG. 1, the electronic device 100 that performs the above-described function may include a processor 110, the memory 130, and the display 190. The processor 110 may perform data processing or an operation associated with control and/or communication of at least one other element(s) of the electronic device 100. The processor 110 may load and process a command or data received from at least one of other elements (e.g., a nonvolatile memory) and may store a variety of data in a nonvolatile memory. For example, the processor 110 may load a command or data, which are stored in the memory 130 with regard to a contents securing module 150, on a volatile memory so as to be processed depending on a specified program routine.

The memory 130 may store a command or data associated with at least one other element of the electronic device 100. For example, the memory 130 may store software and/or a program. For example, the memory 130 may store the contents securing module 150 associated with the contents securing function. For another example, the memory 130 may store contents that the software and/or program stored in the memory 130 uses. In FIG. 1, an embodiment is exemplified as the memory 130 stores first contents 171, second contents 173, third contents 175, and fourth contents 177. However, the number of contents stored in the memory 130 is not limited thereto. The contents may include, for example, contact information that a contact management application uses or photos or videos that an album management application uses.

The contents securing module 150 may include at least one instruction associated with securing the contents stored in the memory 130. For example, the contents securing module 150 may include an instruction to select at least a part of contents stored in the memory 130, an instruction to set the authority to use the selected contents, an instruction to configure the selected contents in a screen, an instruction to output a screen composed of only the selected contents, an instruction to output a screen needing verification of the user upon ending the screen composed of only the selected contents, or the like.

The contents securing module 150 may include a contents selecting module 151, a contents permission setting module 153, and a screen control module 155. The contents selecting module 151 may include a first instruction to select at least one contents satisfying a specified condition among contents stored in the memory 130. For example, the contents selecting module 151 may include the first instruction to select contents filtered through a specific filter among contents stored in the memory 130. According to an embodiment, the specified filter may be set based on location information, time information, shape information, or the like. In any embodiment, the specified filter may be set based on a combination of a variety of information. For example, the specified filter may be set based on at least two of the location information, the time information, and the shape information.

According to an embodiment, the first instruction may be configured to select contents, the creation or storage time of which is included in a specified period, based on the specified filter. For example, the first instruction may include an instruction to extract tag information associated with a time among tag information defined in meta information of the contents, an instruction to determine whether a time value set in the tag information associated with the time is included within the specified period, and an instruction to select the contents in the case where the time value is included within the specified period.

According to another embodiment, the first instruction may be configured to select contents created or stored at a specified location based on the specified filter. For example, the first instruction may include an instruction to extract tag information associated with a location among tag information defined in meta information of the contents, an instruction to determine whether a location value set in the tag information associated with the location corresponds to the specified location, and an instruction to select the contents in the case where the location value corresponds to the specified location.

According to another embodiment, the first instruction may be configured to select contents including a specified shape (e.g., a face shape) based on the specified filter. For example, the first instruction may include an instruction to extract features from the contents, an instruction to analyze a pattern in which the features are distributed, an instruction to determine whether the pattern corresponds to the specified shape, and an instruction to select the contents in the case where the pattern corresponds to the specified shape. The features may include, for example, a corner point or a boundary point of objects included in the contents.

According to an embodiment, the contents selecting module 151 may include a second instruction to select at least one contents of a plurality of contents stored in the memory 130 based on a user input. For example, the second instruction may include an instruction to analyze a user input received in a screen supporting selection of contents and an instruction to select contents based on the result of analyzing the user input.

The contents permission setting module 153 may include a third instruction to set the permission to use contents selected from contents stored in the memory 130. For example, the third instruction may include an instruction to restrict edit, store, delete, or the like of the selected contents. For example, the third instruction may include an instruction to fail to edit, store, or delete the selected contents. Accordingly, the selected contents may not be edited, stored, or deleted in the screen composed of only the selected contents. For another example, the third instruction may include an instruction to make enlargement, reduction, or the like of the selected contents possible. Accordingly, the selected contents may be enlarged or reduced in the screen composed of only the selected contents.

The screen control module 155 may include a fourth instruction to output the screen composed of only the selected contents in the display 190 if a first user input associated with contents securing is received. The first user input may include, for example, an input to select a button that allows the user of the electronic device 100 to let any other person see partial contents of a plurality of contents stored in the memory 130. According to an embodiment, the fourth instruction may make the first instruction or the second instruction executable if the first user input is received. Also, the fourth instruction may include an instruction to configure a screen with only contents selected by the execution result of the first instruction or the second instruction and an instruction to output the configured screen in the display 190.

According to an embodiment, the screen control module 155 may include a fifth instruction to output a screen needing verification of the user of the electronic device 100 in the display 190 if a user input to end the screen composed of only the selected contents is received. The screen needing the user verification may include, for example, a lock screen or the like. Accordingly, any other person except for the user of the electronic device 100 may fail to view or use any other contents except for the selected contents.

According to an embodiment, the screen control module 155 may include a sixth instruction to output a screen supporting selection of any other contents except for the selected contents if a second user input is received in the screen composed of only the selected contents. The second user input may include, for example, an input to select a button that allows the user of the electronic device 100 to select contents selected through a specified filter or any other contents except for previously selected contents. According to an embodiment, the sixth instruction may include an instruction to configure, in a screen, at least one other contents stored in the memory 130 except for the selected contents and an instruction to output the configured screen in the display 190. A screen to select the contents may include a button (e.g., a check box button) supporting selection of contents included in a screen.

The display 190 may display a variety of contents to the user. For example, the display 190 may output a screen implemented with only contents selected through the contents securing module 150. For another example, the display 190 may output a screen supporting selection of contents stored in the memory 130. For another example, if an output of the screen implemented with only selected contents ends, the display 190 may output a screen needing verification of the user of the electronic device 100.

As described above, according to various embodiments, an electronic device (e.g., the electronic device 100) may include a memory (e.g., the memory 130) configured to store contents, a display (e.g., the display 190) configured to output the contents, and a processor (e.g., the processor 110) operatively connected with the memory and the display. The memory may store instructions that, when executed, cause the processor to select at least one contents satisfying a specified condition among a plurality of contents stored in the memory in response to a first user input, output a first screen composed of the selected at least one contents in the display, output a second screen for verification of a user of the electronic device in the display if a second user input to end the output of the first screen is received.

According to various embodiments, the specified condition may include at least one of a condition that a time value set in tag information associated with a time among tag information defined in meta information of the plurality of contents is included within a specified period, a condition that a location value set in tag information associated with a location among the tag information defined in the meta information of the plurality of contents corresponds to a specified location, and a condition that a distribution pattern of at least one of a corner point and a boundary point of an object included in the plurality of contents corresponds to a specified shape.

According to various embodiments, the memory may further store instructions that, when executed, cause the processor to set permission to use the selected at least one contents.

According to various embodiments, the permission to use may be set to restrict at least one of edit, store, and delete of the selected at least one contents.

According to various embodiments, the second screen may include a lock screen.

According to various embodiments, the memory may further store instructions that, when executed, cause the processor to output a third screen for selection of at least one other contents stored in the memory except for the selected at least one contents.

According to various embodiments, the third screen may include a button for deselection of the selected at least one contents or selection of the at least one other contents.

As described above, according to various embodiments, an electronic device (e.g., the electronic device 100) may include a memory (e.g., the memory 130) configured to store contents, a display (e.g., the display 190) configured to output the contents, and a processor (e.g., the processor 110) operatively connected with the memory and the display. The memory may further store instructions that, when executed, cause the processor to output a first screen composed of a plurality of contents stored in the memory in response to a first user input, select at least one contents among the plurality of contents in response to a second user input, output a second screen composed of the selected at least one contents in the display, output a third screen for verification of a user of the electronic device in the display if a third user input to end the output of the second screen is received.

According to various embodiments, the first screen may include a button for selection of at least one contents of the plurality of contents or deselection of selected contents in response to the second user input.

According to various embodiments, the memory may further store instructions that, when executed, cause the processor to set permission to use the selected at least one contents.

According to various embodiments, the permission to use may be set to restrict at least one of edit, store, and delete of the selected at least one contents.

According to various embodiments, the third screen may include a lock screen.

Figure 2:
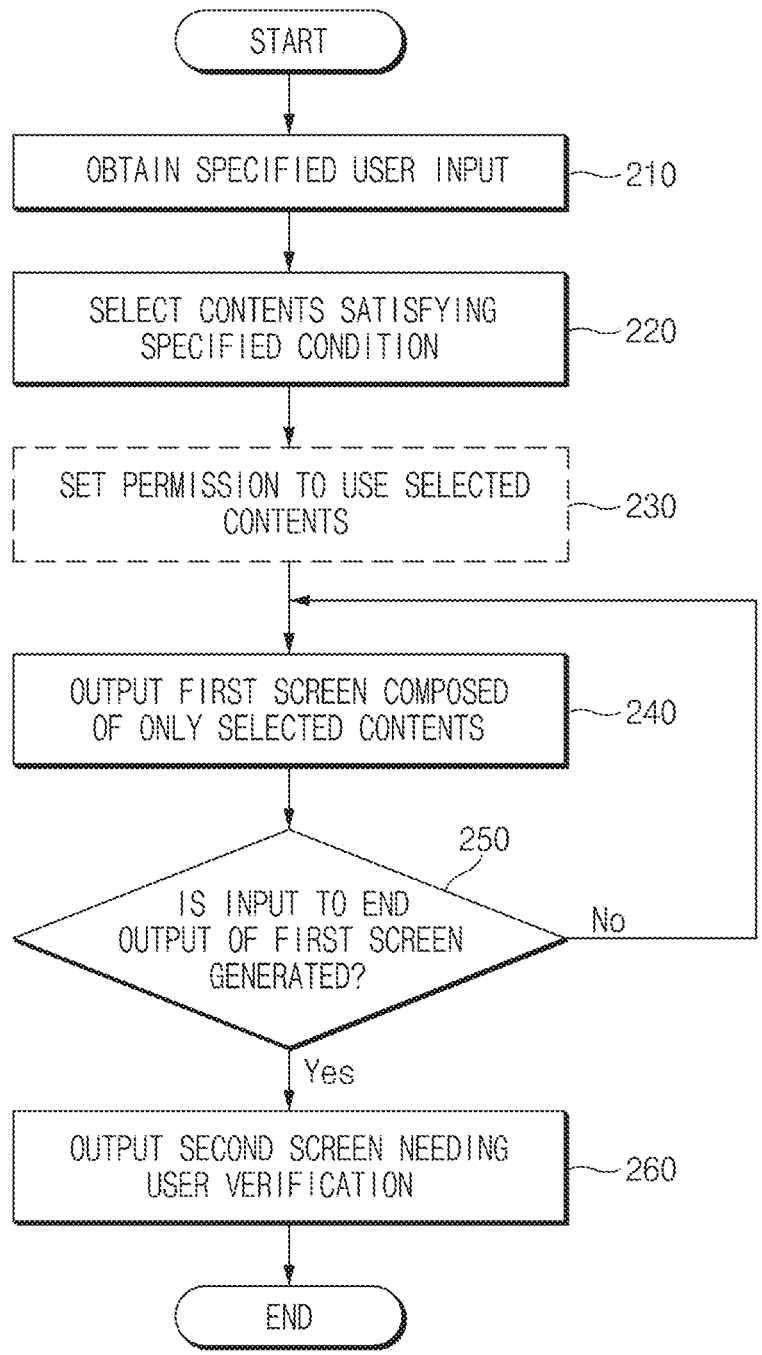
FIG. 2 is a view illustrating a first operating method of an electronic device associated with contents securing according to an embodiment of the present disclosure.

FIG. 2 is a view illustrating a first operating method of an electronic device associated with contents securing according to an embodiment of the present disclosure.

Referring to FIG. 2, in operation 210, an electronic device (e.g., the electronic device 100) may obtain a specified user input. The specified user input may include, for example, an input to select a button that allows the user of the electronic device 100 to let any other person see partial contents of a plurality of contents stored in a memory (e.g., the memory 130).

If obtaining the specified user input, in operation 220, the electronic device may select contents satisfying a specified condition. For example, the electronic device may select contents, the creation or storage time of which is included within a specified period, among contents stored in the memory. In this case, the electronic device may extract tag information associated with a time among tag information defined in meta information of the contents, may determine whether a time value set in the tag information associated with the time is included within the specified period, and may select the contents in the case where the time value is included within the specified period.

For another example, the electronic device may select contents created or stored at a specified location among the contents stored in the memory. In this case, the electronic device may extract tag information associated with a location among tag information defined in meta information of the contents, may determine whether a location value set in the tag information associated with the location corresponds to the specified location, and may select the contents in the case where the location value corresponds to the specified location.

For another example, the electronic device may select contents including a specified shape among contents stored in the memory. In this case, the electronic device may extract features from the contents, may analyze a pattern in which the features are distributed, may determine whether the pattern corresponds to the specified shape, and may select the contents in the case where the pattern corresponds to the specified shape.

If the contents are selected, in operation 230, the electronic device may set the permission to use the selected contents. For example, the electronic device may set the permission such that the selected contents are not edited, stored, or deleted. In any embodiment, the electronic device may set the permission such that the selected contents are enlarged or reduced.

In operation 240, the electronic device may output a first screen implemented with only the selected contents in a display (e.g., the display 190). In operation 250, the electronic device may determine whether an input to end an output of the first screen is received. The input to end the output of the first screen may include, for example, an input to select a home button, a back button, a power button, or the like.

If the input to end the output of the first screen is received, in operation 260, the electronic device may output a second screen needing verification of the user of the electronic device in the display. The second screen may include, for example, a lock screen or the like.

In any embodiment, the electronic device may omit the execution of operation 230. Alternatively, the electronic device may perform operation 240 before operation 230 is performed.

Figure 3:
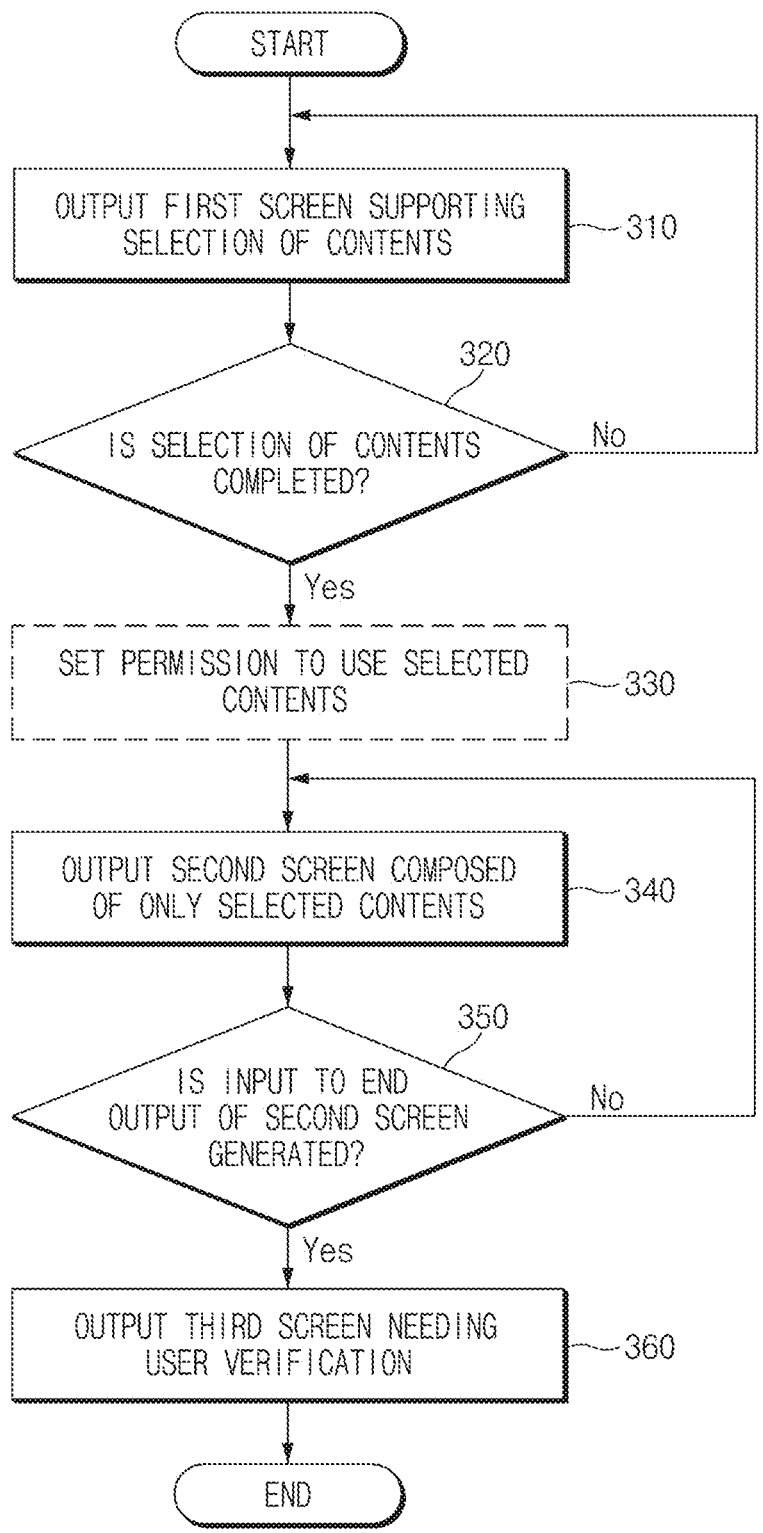
FIG. 3 is a view illustrating a first operating method of an electronic device associated with contents securing according to an embodiment of the present disclosure.

FIG. 3 is a view illustrating a first operating method of an electronic device associated with contents securing according to an embodiment of the present disclosure.

Referring to FIG. 3, in operation 310, an electronic device (e.g., the electronic device 100) may output, in a display (e.g., the display 190), a first screen supporting selection of at least one of contents stored in a memory (e.g., the memory 130). For example, in the case where the user of the electronic device selects a button that allows any other person to view partial contents among the contents stored in the memory, the electronic device may output the first screen in the display. For another example, in the case where there is selected a button that supports selection of contents selected through a specified filter or any other contents except for previously selected contents, the electronic device may output the first screen in the display.

In operation 320, the electronic device may determine whether the selection of contents is completed. For example, the electronic device may determine whether a contents selection complete button included in the first screen is selected. For example, if at least one contents of a plurality of contents included in the first screen is selected, the contents selection complete button may be activated and displayed such that the user selects the button.

If the selection of the contents is completed, in operation 330, the electronic device may set the permission to use the selected contents. For example, the electronic device may set the permission such that the selected contents are not edited, stored, or deleted. In any embodiment, the electronic device may set the permission such that the selected contents are enlarged or reduced.

In operation 340, the electronic device may output a second screen implemented with only the selected contents in the display. In operation 350, the electronic device may determine whether an input to end an output of the second screen is received. The input to end the output of the second screen may include, for example, an input to select a home button, a back button, a power button, or the like.

If the input to end the output of the second screen is received, in operation 360, the electronic device may output a third screen needing verification of the user of the electronic device in the display. The third screen may include, for example, a lock screen or the like.

In any embodiment, the electronic device may omit the execution of operation 330. Alternatively, the electronic device may perform operation 340 before operation 330 is performed.

As described above, according to various embodiments, a contents securing method of an electronic device may include obtaining a first user input, selecting at least one contents among a plurality of contents stored in a memory of the electronic device in response to the first user input, outputting a first screen composed of the selected at least one content in a display of the electronic device, and outputting a second screen for verification of a user of the electronic device in the display if a second user input to end the output of the first screen is received.

According to various embodiments, the selecting of the at least one contents may include selecting the at least one contents satisfying a specified condition among the plurality of contents stored in the memory.

According to various embodiments, the specified condition may include at least one of a condition that a time value set in tag information associated with a time among tag information defined in meta information of the plurality of contents is included within a specified period, a condition that a location value set in tag information associated with a location among the tag information defined in the meta information of the plurality of contents corresponds to a specified location, and a condition that a distribution pattern of at least one of a corner point and a boundary point of an object included in the plurality of contents corresponds to a specified shape.

According to various embodiments, the method may further include setting permission to use the selected at least one contents.

According to various embodiments, the setting of the permission may include restricting at least one of edit, store, and delete of the selected at least one contents.

According to various embodiments, the second screen may include a lock screen.

According to various embodiments, the method may further include outputting a third screen for selection of at least one other contents stored in the memory except for the selected at least one contents.

According to various embodiments, the third screen may include a button for deselection of the selected at least one contents or selection of the at least one other contents.

Figure 4:
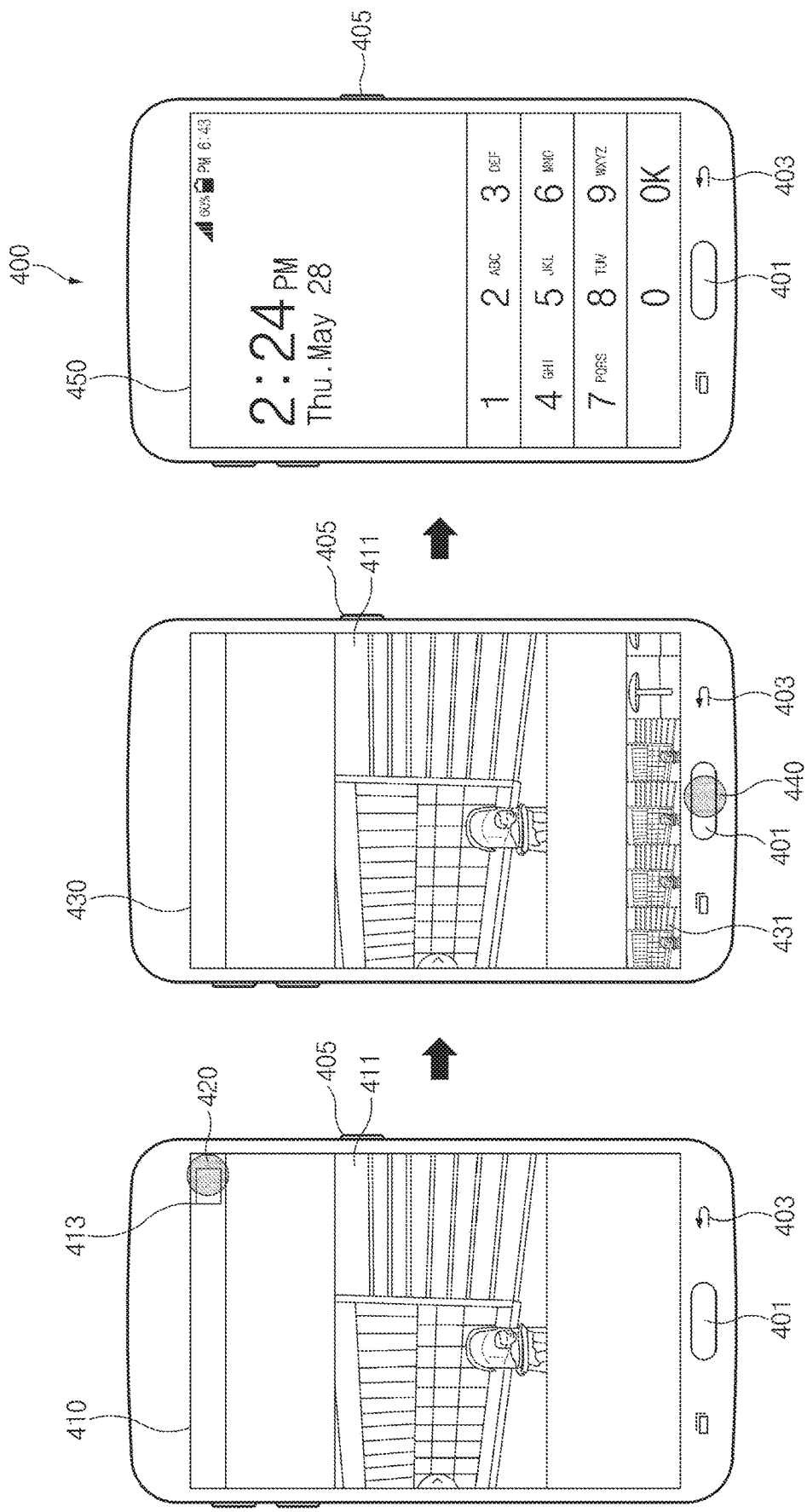
FIG. 4 is a view illustrating a screen of a first operating method of an electronic device associated with contents securing according to an embodiment of the present disclosure.

FIG. 4 is a view illustrating a screen of a first operating method of an electronic device associated with contents securing according to an embodiment of the present disclosure.

An electronic device 400 (e.g., the electronic device 100) may support a function of securing contents stored in a memory (e.g., the memory 130). For example, in the case where a user of the electronic device 400 lets any other person see a part of the contents stored in the memory, to prevent critical information such as personal information from being exposed, the electronic device 400 may output a screen implemented with only contents satisfying a specified condition or only contents selected by the user, in a display (e.g., the display 190). Also, if an input to end a screen implemented with only selected contents is received, the electronic device 400 may output a screen needing verification of the user in the display.

Referring to FIG. 4, the electronic device 400 may output a first screen 410 composed of contents 411 stored in the memory in the display. For example, the first screen may include an execution screen of an application for managing contacts composed of contact information or an execution screen of an application for managing an album composed of photos or videos. An embodiment is illustrated in FIG. 4 as the execution screen of the album management application is output as the first screen 410.

According to an embodiment, the first screen 410 may include a button 413 that allows the user of the electronic device 400 to let any other person see partial contents of a plurality of contents stored in the memory 130. As illustrated in FIG. 4, the button 413 may be a soft button implemented in a specific area of the first screen 410 or may be a physical button implemented in a bezel area of the electronic device 400.

According to an embodiment, if a user input 420 to select the button 413 is received, the electronic device 400 may select at least one contents 431 satisfying a specified condition among the contents stored in the memory. For example, the electronic device 400 may select contents, the creation or storage time of which is included within a specified period, among the contents stored in the memory, contents created or stored at a specified location, or contents including a specified shape.

According to an embodiment, the specified condition may be differently set depending on the contents 411 of the first screen 410. For example, the specified condition may be set based on a time when the contents 411 of the first screen 410 are created or stored, a location at which the contents 411 are created or stored, or a specified shape included in the contents 411. For example, the electronic device 400 may select contents, which are created or stored at the same or similar time as the contents 411 of the first screen 410, from among the contents stored in the memory, may select contents created or stored at the same or similar location as the contents 411, or may select contents including the same or similar shape as the specified shape included in the contents 411.

For example, in the case where the contents 411 of the first screen 410 are contents created or stored on Aug. 14, 2016, the electronic device 400 may select contents, which are created or stored at the same or similar date as Aug. 14, 2016, from among the contents stored in the memory. For another example, in the case where the contents 411 of the first screen 410 are contents created or stored in Paris, France, the electronic device 400 may select contents, which are created or stored at the same or neighboring location as Paris, France, from among the contents stored in the memory. For another example, in the case where a face of a specific person is included in the contents 411 of the first screen 410, the electronic device 400 may select contents including the face of the specific person among the contents stored in the memory.

According to an embodiment, the electronic device 400 may output a second screen 430 composed of only the selected at least one contents 431 in the display. For example, in the case where the selected at least one contents 431 are in plurality, the electronic device 400 may configure a list of items respectively corresponding to the plurality of selected contents in the second screen 430. For another example, the electronic device 400 may configure a thumbnail image of the selected at least one contents 431 in the second screen 430. An embodiment is illustrated in FIG. 4 as the electronic device 400 disposes the contents 411 of the first screen 410 at the center of the second screen 430 and disposes a thumbnail image of the selected at least one contents 431 at a lower end of the second screen 430.

According to an embodiment, if a user input 440 to end the second screen 430 is received, the electronic device 400 may output a third screen 450 needing verification of the user of the electronic device 400 in the display. The user input 440 to end the second screen 430 may include, for example, an input to select a home button 401, a back button 403, a power button 405, or the like of the electronic device

400. In any embodiment, if an input to select the power button 405 is received, the electronic device 400 may turn off a screen of the display; if an input to turn on a screen of the display again is received, the electronic device 400 may output the third screen 450 needing verification of the user of the electronic device 400 in the display. The third screen 450 needing the user verification may include, for example, a lock screen or the like.

Figure 5:
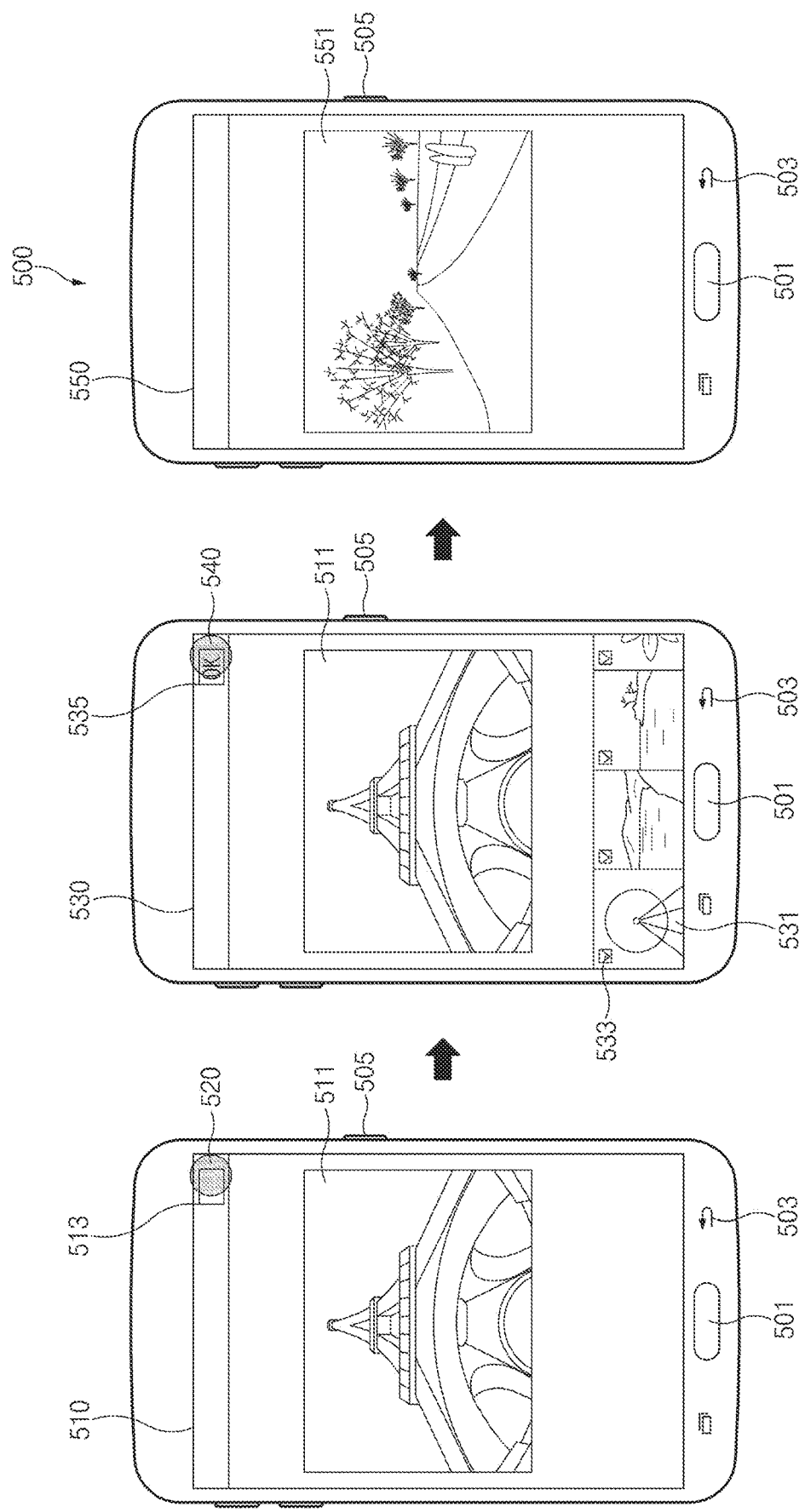
FIG. 5 is a view illustrating a screen of a second operating method of an electronic device associated with contents securing according to an embodiment of the present disclosure.

FIG. 5 is a view illustrating a screen of a second operating method of an electronic device associated with contents securing according to an embodiment of the present disclosure.

Referring to FIG. 5, an electronic device 500 (e.g., the electronic device 100) may output, in a display (e.g., the display 190), a first screen 510 composed of contents 511 stored in a memory (e.g., the memory 130). According to an embodiment, the first screen 510 may include a button 513 that allows the user of the electronic device 500 to let any other person see partial contents of a plurality of contents stored in the memory 130. As illustrated in FIG. 5, the button 513 may be a soft button implemented in a specific area of the first screen 510 or may be a physical button implemented in a bezel area of the electronic device 500.

According to an embodiment, if a user input 520 to select the button 513 is received, the electronic device 500 may output a second screen 530 supporting selection of at least one contents of a plurality of contents stored in the memory. For example, the electronic device 500 may output, in the display, the second screen 530 supporting selection of contents that the user of the electronic device 500 wants to show to any other person.

According to an embodiment, the electronic device 500 may differently configure the second screen 530 depending on the contents 511 of the first screen 510. For example, the electronic device 500 may output, in the display, the second screen 530 supporting selection of a part of contents created or stored at the same or similar time as the contents 511 of the first screen 510, contents created or stored at the same or similar location as the contents 511, or contents including the same or similar shape as a specified shape included in the contents 511. As such, when selecting contents, the user of the electronic device 500 may easily and quickly select only a part of contents satisfying a specified condition without needing to verify all contents stored in the memory. An embodiment is illustrated in FIG. 5 as the electronic device 500 disposes the contents 511 of the first screen 510 at the center of the second screen 530 and disposes a thumbnail image of contents 531 satisfying the specified condition at a lower end of the second screen 530.

According to an embodiment, the second screen 530 may include a button 533 supporting selection of at least one of the contents 531 satisfying the specified condition. For example, the button 533 for selection or deselection, for example, a check box button or a toggle button may be implemented in a specified area (e.g., a left top area) of each of the contents 531 of the second screen 530. Also, the second screen 530 may include a contents selection complete button 535 that makes it possible to inform the electronic device 500 that selection of contents is completed.

According to an embodiment, if a user input 540 to select the contents selection complete button 535 is received, the electronic device 500 may output, in the display, a third screen 550 composed of only selected contents 551 selected in the second screen 530. An embodiment is illustrated in FIG. 5 as one of the selected contents 551 is output at the center of the third screen 550. However, a way to output the selected contents 551 is not limited thereto. In any embodiment, in the case where the selected contents 551 are in plurality, the electronic device 500 may configure a list of items respectively corresponding to the plurality of selected contents 551 in the third screen 550. Alternatively, the electronic device 500 may output one of the selected contents 551 in a specified area of the third screen 550; if a specified user input, for example, a swipe input or the like is received, the electronic device 500 may configure the third screen 550 in a way to output the remaining selected contents 551 other than the one contents sequentially.

Although not illustrated in FIG. 5, if a user input to end the third screen 550 is received, the electronic device 500 may output a screen needing verification of the user of the electronic device 500 in the display. For example, if a user input to select a home button 501, a back button 503, a power button 505, or the like, the electronic device 500 may output a lock screen or the like in the display.

Figure 6:
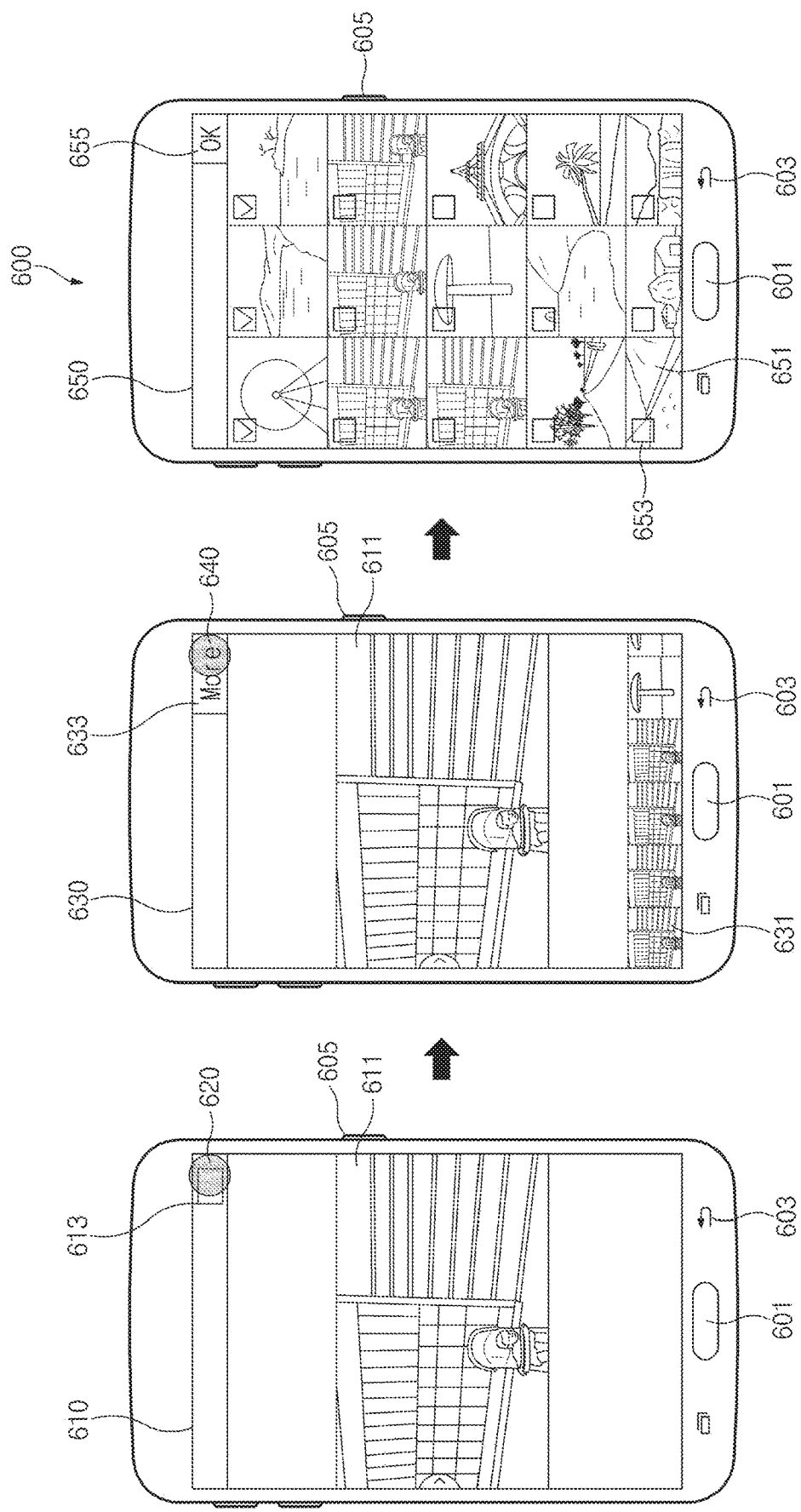
FIG. 6 is a view illustrating a screen associated with additionally selecting contents according to an embodiment of the present disclosure.

FIG. 6 is a view illustrating a screen associated with additionally selecting contents according to an embodiment of the present disclosure.

Referring to FIG. 6, an electronic device 600 (e.g., the electronic device 100) may output, in a display (e.g., the display 190), a first screen 610 composed of contents 611 stored in a memory (e.g., the memory 130). According to an embodiment, the first screen 610 may include a button 613 that allows the user of the electronic device 600 to let any other person see partial contents of a plurality of contents stored in the memory 130. As illustrated in FIG. 6, the button 613 may be a soft button implemented in a specific area of the first screen 610 or may be a physical button implemented in a bezel area of the electronic device 600.

According to an embodiment, if a user input 620 to select the button 613 is received, the electronic device 600 may select at least one contents 631 satisfying a specified condition among the contents stored in the memory. Also, the electronic device 600 may output a second screen 630 including the selected at least one contents 631 in the display. An embodiment is illustrated in FIG. 6 as the electronic device 600 disposes the contents 611 of the first screen 610 at the center of the second screen 630 and disposes a thumbnail image of the selected at least one contents 631 satisfying a specified condition at a lower end of the second screen 630.

According to an embodiment, the second screen 630 may include a button 633 supporting selection of contents satisfying a specified condition or any other contents stored in the memory except for previously selected contents. If a user input 640 to select the button 633 is received, the electronic device 600 may output a third screen 650 composed of contents 651 stored in the memory in the display.

According to an embodiment, the third screen 650 may include a button 653 supporting selection of at least one of the contents 651 stored in the memory. For example, the button 653 for selection or deselection, for example, a check box button or a toggle button may be implemented in a specified area (e.g., a left top area) of each of the contents 651 of the third screen 650. As such, the user of the electronic device 600 may deselect contents satisfying a specified condition or previously selected contents or may select any other contents stored in the memory. Also, the third screen 650 may include a contents selection complete button 655 that makes it possible to inform the electronic device 600 that selection of contents is completed.

Although not illustrated in FIG. 6, if a user input to select the contents selection complete button 655 is received, the electronic device 600 may output, in the display, a fourth screen composed of only selected contents 551 selected in the third screen 650. Also, if a user input to end the fourth screen is received, the electronic device 600 may output a screen needing verification of the user of the electronic device 600 in the display. For example, if a user input to select a home button 601, a back button 603, a power button 605, or the like, the electronic device 600 may output a lock screen or the like in the display.

Figure 7:
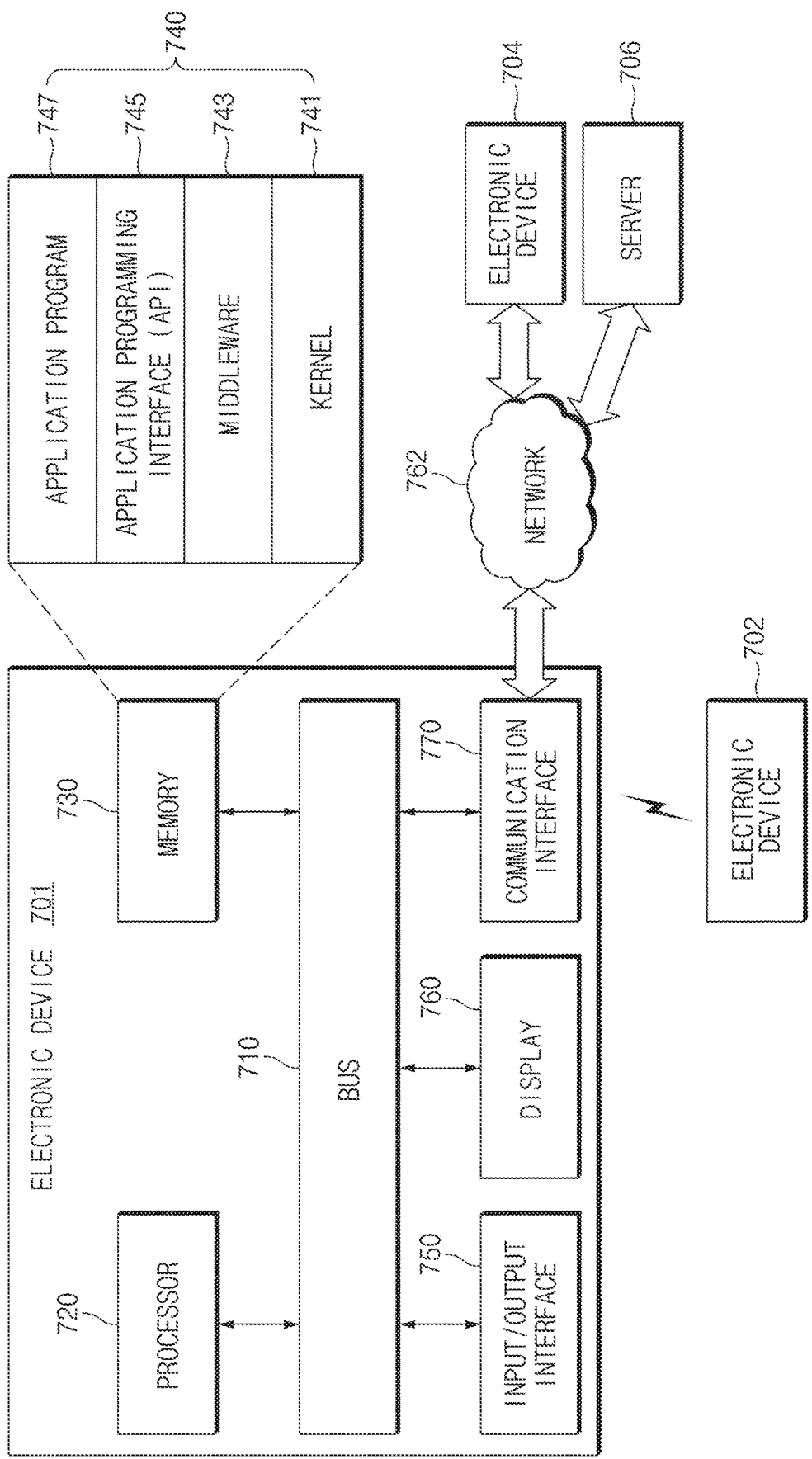
FIG. 7 illustrates an electronic device in a network environment according to an embodiment of the present disclosure of the present disclosure.

FIG. 7 illustrates an electronic device in a network environment according to an embodiment of the present disclosure.

Referring to FIG. 7, an electronic device 701 in a network environment 700 according to various embodiments of the present disclosure will be described with reference to FIG. 7. The electronic device 701 may include a bus 710, a processor 720, a memory 730, an input/output interface 750, a display 760, and a communication interface 770. In various embodiments of the present disclosure, at least one of the foregoing elements may be omitted or another element may be added to the electronic device 701.

The bus 710 may include a circuit for connecting the processor 720, the memory 730, the input/output interface 750, the display 760, and the communication interface 770 to each other and transferring communications (e.g., control messages and/or data) among the same.

The processor 720 may include at least one of a CPU, an AP, or a communication processor (CP). The processor 720 may perform data processing or an operation related to communication and/or control of at least one of the other elements of the electronic device 701.

The memory 730 may include a volatile memory and/or a nonvolatile memory. The memory 730 may store instructions or data related to at least one of the other elements of the electronic device 701. According to an embodiment of the present disclosure, the memory 730 may store software and/or a program 740. The program 740 may include, for example, a kernel 741, a middleware 743, an application programming interface (API) 745, and/or an application program (or an application) 747. At least a portion of the kernel 741, the middleware 743, or the API 745 may be referred to as an operating system (OS).

The kernel 741 may control or manage system resources (e.g., the bus 710, the processor 720, the memory 730, or the like) used to perform operations or functions of other programs (e.g., the middleware 743, the API 745, or the application program 747). Furthermore, the kernel 741 may provide an interface for allowing the middleware 743, the API 745, or the application program 747 to access individual elements of the electronic device 701 in order to control or manage the system resources.

The middleware 743 may serve as an intermediary so that the API 745 or the application program 747 communicates and exchanges data with the kernel 741.

Furthermore, the middleware 743 may handle one or more task requests received from the application program 747 according to a priority order. For example, the middleware 743 may assign at least one application program 747 a priority for using the system resources (e.g., the bus 710, the processor 720, the memory 730, or the like) of the electronic device 701. For example, the middleware 743 may handle the one or more task requests according to the priority assigned to the at least one application, thereby performing scheduling or load balancing with respect to the one or more task requests.

The API 745, which is an interface for allowing the application program 747 to control a function provided by the kernel 741 or the middleware 743, may include, for example, at least one interface or function (e.g., instructions) for file control, window control, image processing, character control, or the like.

The input/output interface 750 may serve to transfer an instruction or data input from a user or another external device to (an)other element(s) of the electronic device 701. Furthermore, the input/output interface 750 may output instructions or data received from (an)other element(s) of the electronic device 701 to the user or another external device.

The display 760 may include, for example, a liquid crystal display (LCD), a light-emitting diode (LED) display, an organic LED (OLED) display, a microelectromechanical systems (MEMS) display, or an electronic paper display. The display 760 may present various content (e.g., a text, an image, a video, an icon, a symbol, or the like) to the user. The display 760 may include a touch screen, and may receive a touch, gesture, proximity or hovering input from an electronic pen or a part of a body of the user.

The communication interface 770 may set communications between the electronic device 701 and an external device (e.g., a first external electronic device 702, a second external electronic device 704, or a server 706). For example, the communication interface 770 may be connected to a network 762 via wireless communications or wired communications so as to communicate with the external device (e.g., the second external electronic device 704 or the server 706).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, short-range communications 764. The short-range communications may include at least one of wireless fidelity (Wi-Fi), bluetooth (BT), near field communication (NFC), magnetic stripe transmission (MST), or GNSS.

The MST may generate pulses according to transmission data and the pulses may generate electromagnetic signals. The electronic device 701 may transmit the electromagnetic signals to a reader device such as a point of sales (POS) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 762 may include at least one of telecommunications networks, for example, a computer network (e.g., local area network (LAN) or wide area network (WAN)), the Internet, or a telephone network.

The types of the first external electronic device 702 and the second external electronic device 704 may be the same as or different from the type of the electronic device 701. According to an embodiment of the present disclosure, the server 706 may include a group of one or more servers. A portion or all of operations performed in the electronic device 701 may be performed in one or more other electronic devices (e.g., the first external electronic device 702, the second external electronic device 704, or the server 706). When the electronic device 701 should perform a certain function or service automatically or in response to a request, the electronic device 701 may request at least a portion of functions related to the function or service from another device (e.g., the first external electronic device 702, the second external electronic device 704, or the server 706) instead of or in addition to performing the function or service for itself. The other electronic device (e.g., the first external electronic device 702, the second external electronic device 704, or the server 706) may perform the requested function or additional function, and may transfer a result of the performance to the electronic device 701. The electronic device 701 may use a received result itself or additionally process the received result to provide the requested function or service. To this end, for example, a cloud computing technology, a distributed computing technology, or a client-server computing technology may be used.

Figure 8:
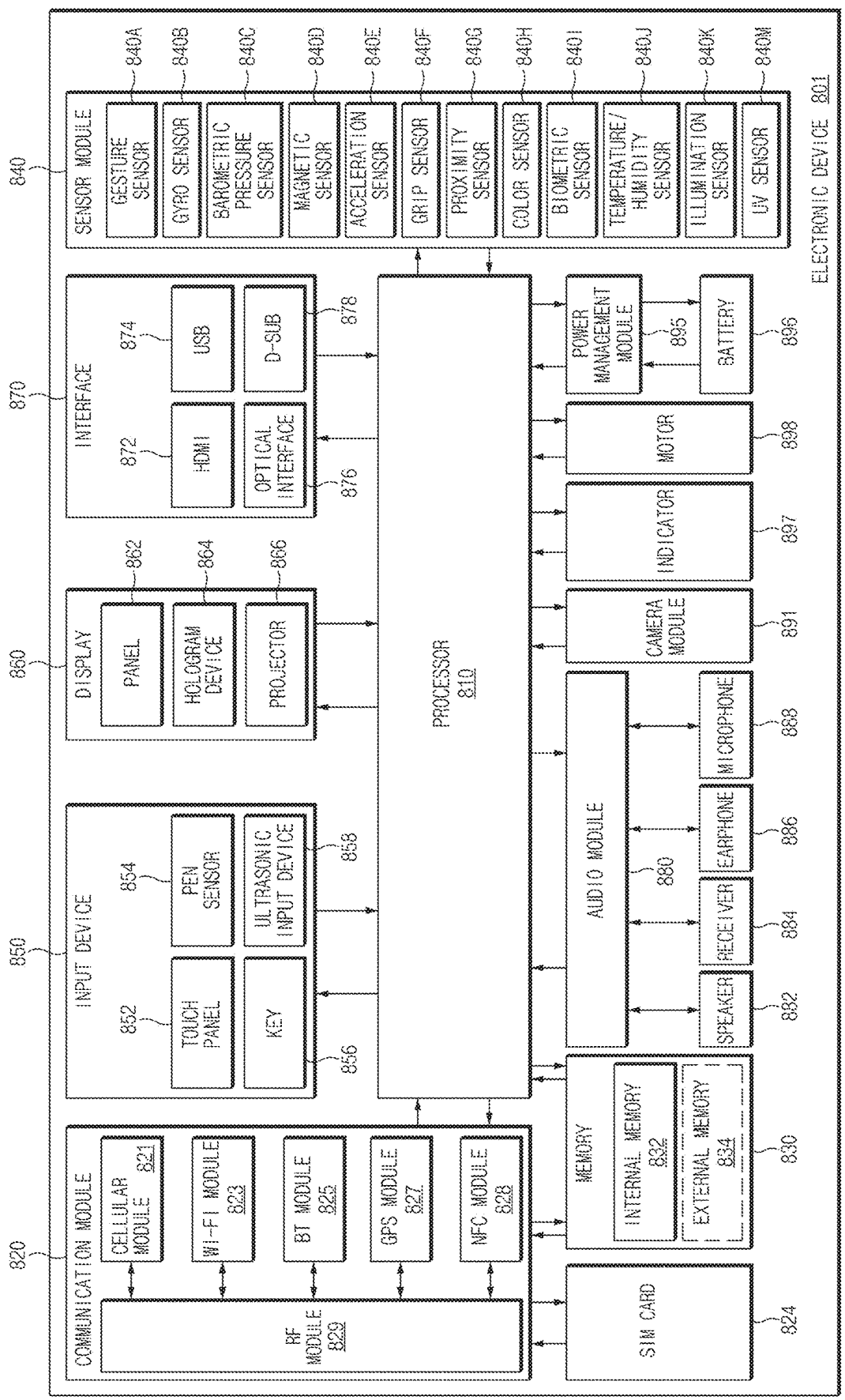
FIG. 8 is a block diagram illustrating an electronic device according to an embodiment of the present disclosure of the present disclosure.

FIG. 8 is a block diagram illustrating an electronic device according to an embodiment of the present disclosure.

Referring to FIG. 8, an electronic device 801 may include, for example, a part or the entirety of the electronic device 701 illustrated in FIG. 7. The electronic device 801 may include at least one processor (e.g., AP) 810, a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898.

The processor 810 may run an OS or an application program so as to control a plurality of hardware or software elements connected to the processor 810, and may process various data and perform operations. The processor 810 may be implemented with, for example, a system on chip (SoC). According to an embodiment of the present disclosure, the processor 810 may further include a graphic processing unit (GPU) and/or an image signal processor (ISP). The processor 810 may include at least a portion (e.g., a cellular module 821) of the elements illustrated in FIG. 8. The processor 810 may load, on a volatile memory, an instruction or data received from at least one of other elements (e.g., a nonvolatile memory) to process the instruction or data, and may store various data in a nonvolatile memory.

The communication module 820 may have a configuration that is the same as or similar to that of the communication interface 770 of FIG. 7. The communication module 820 may include, for example, the cellular module 821, a Wi-Fi module 823, a BT module 825, a GNSS module 827 (e.g., a GPS module, a GLONASS module, a BeiDou module, or a Galileo module), an NFC module 828, and a radio frequency (RF) module 829.

The cellular module 821 may provide, for example, a voice call service, a video call service, a text message service, or an Internet service through a communication network. The cellular module 821 may identify and authenticate the electronic device 801 in the communication network using the SIM 824 (e.g., a SIM card). The cellular module 821 may perform at least a part of functions that may be provided by the processor 810. The cellular module 821 may include a CP.

Each of the Wi-Fi module 823, the BT module 825, the GNSS module 827 and the NFC module 828 may include, for example, a processor for processing data transmitted/received through the modules. According to some various embodiments of the present disclosure, at least a part (e.g., two or more) of the cellular module 821, the Wi-Fi module 823, the BT module 825, the GNSS module 827, and the NFC module 828 may be included in a single integrated chip (IC) or IC package.

The RF module 829 may transmit/receive, for example, communication signals (e.g., RF signals). The RF module 829 may include, for example, a transceiver, a power amp module (PAM), a frequency filter, a low noise amplifier (LNA), an antenna, or the like. According to another embodiment of the present disclosure, at least one of the cellular module 821, the Wi-Fi module 823, the BT module 825, the GNSS module 827, or the NFC module 828 may transmit/receive RF signals through a separate RF module.

The SIM 824 may include, for example, an embedded SIM and/or a card containing the subscriber identity module, and may include unique identification information (e.g., an integrated circuit (IC) card identifier (ICCID)) or subscriber information (e.g., international mobile subscriber identity (IMSI)).

The memory 830 (e.g., the memory 730) may include, for example, an internal memory 832 or an external memory 834. The internal memory 832 may include at least one of a volatile memory (e.g., a dynamic random-access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 834 may include a flash drive such as a compact flash (CF), a secure digital (SD), a Micro-SD, a Mini-SD, an extreme digital (xD), a multi-media card (MMC), a memory stick, or the like. The external memory 834 may be operatively and/or physically connected to the electronic device 801 through various interfaces.

The sensor module 840 may, for example, measure physical quantity or detect an operation state of the electronic device 801 so as to convert measured or detected information into an electrical signal. The sensor module 840 may include, for example, at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, or an ultraviolet (UV) sensor 840M. Additionally or alternatively, the sensor module 840 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 840 may further include a control circuit for controlling at least one sensor included therein. In some various embodiments of the present disclosure, the electronic device 801 may further include a processor configured to control the sensor module 840 as a part of the processor 810 or separately, so that the sensor module 840 is controlled while the processor 810 is in a sleep state.

The input device 850 may include, for example, a touch panel 852, a (digital) pen sensor 854, a key 856, or an ultrasonic input device 858. The touch panel 852 may employ at least one of capacitive, resistive, IR, and UV sensing methods. The touch panel 852 may further include a control circuit. The touch panel 852 may further include a tactile layer so as to provide a haptic feedback to a user.

The (digital) pen sensor 854 may include, for example, a sheet for recognition which is a part of a touch panel or is separate. The key 856 may include, for example, a physical button, an optical button, or a keypad. The ultrasonic input device 858 may sense ultrasonic waves generated by an input tool through a microphone 888 so as to identify data corresponding to the ultrasonic waves sensed.

The display 860 (e.g., the display 760) may include a panel 862, a hologram device 864, or a projector 866. The panel 862 may have a configuration that is the same as or similar to that of the display 760 of FIG. 7. The panel 862 may be, for example, flexible, transparent, or wearable. The panel 862 and the touch panel 852 may be integrated into a single module. The hologram device 864 may display a stereoscopic image in a space using a light interference phenomenon. The projector 866 may project light onto a screen so as to display an image. The screen may be disposed in the inside or the outside of the electronic device 801. According to an embodiment of the present disclosure, the display 860 may further include a control circuit for controlling the panel 862, the hologram device 864, or the projector 866.

The interface 870 may include, for example, an HDMI 872, a USB 874, an optical interface 876, or a d-subminiature (D-sub) 878. The interface 870, for example, may be included in the communication interface 770 illustrated in FIG. 7. Additionally or alternatively, the interface 870 may include, for example, a mobile high-definition link (MHL) interface, an SD card/MMC interface, or an IR data association (IrDA) interface.

The audio module 880 may convert, for example, a sound into an electrical signal or vice versa. At least a portion of elements of the audio module 880 may be included in the input/output interface 750 illustrated in FIG. 7. The audio module 880 may process sound information input or output through a speaker 882, a receiver 884, an earphone 886, or the microphone 888.

The camera module 891 is, for example, a device for shooting a still image or a video. According to an embodiment of the present disclosure, the camera module 891 may include at least one image sensor (e.g., a front sensor or a rear sensor), a lens, an ISP, or a flash (e.g., an LED or a xenon lamp).

The power management module 895 may manage power of the electronic device 801. According to an embodiment of the present disclosure, the power management module 895 may include a power management IC (PMIC), a charger IC, or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, or the like. The motor 898 may convert an electrical signal into a mechanical vibration, and may generate a vibration or haptic effect. Although not illustrated, a processing device (e.g., a GPU) for supporting a mobile TV may be included in the electronic device 801. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 9:
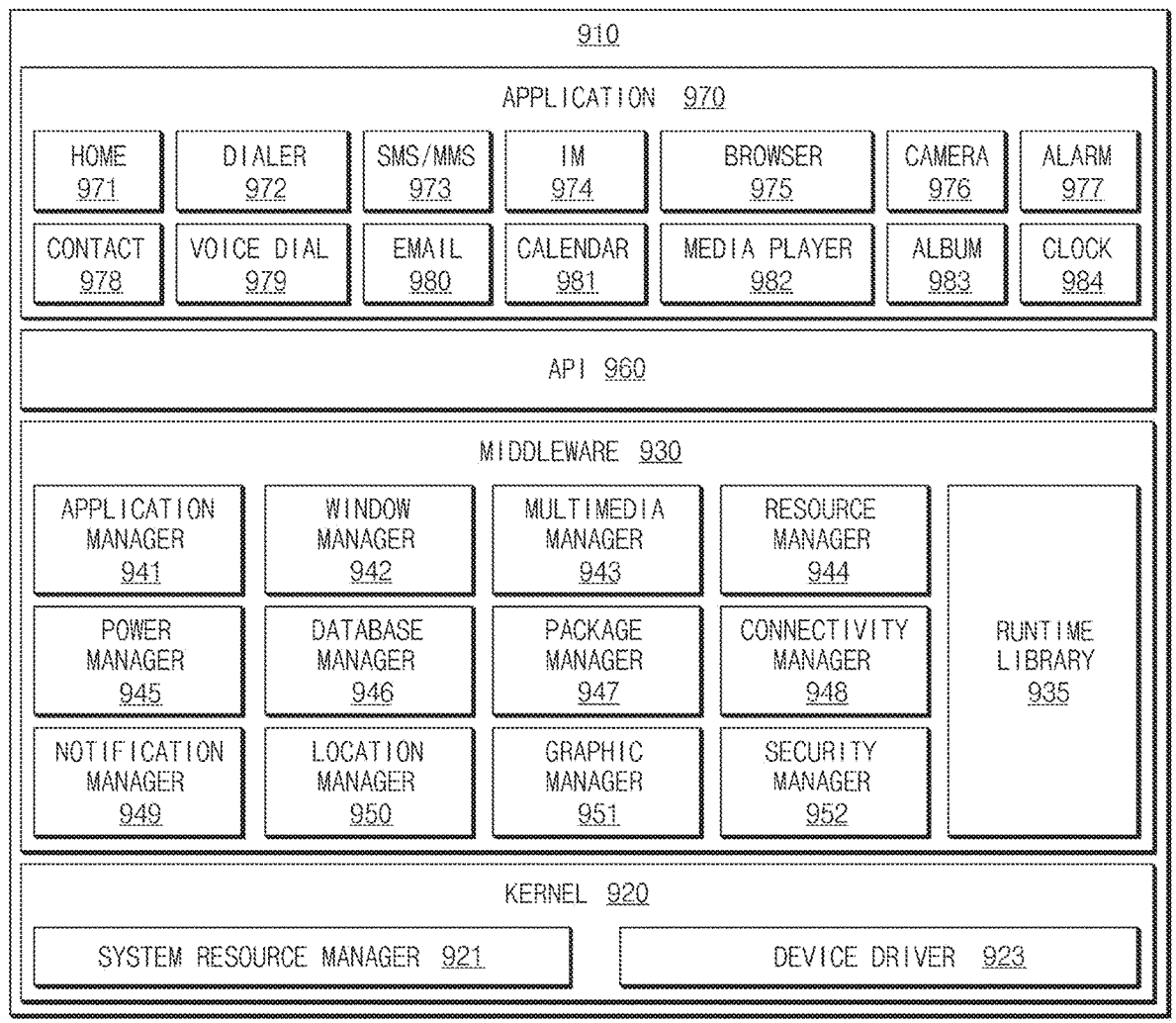
FIG. 9 is a block diagram illustrating a program module according to an embodiment of the present disclosure of the present disclosure.

FIG. 9 is a block diagram illustrating a program module according to an embodiment of the present disclosure.

Referring to FIG. 9, a program module 910 (e.g., the program 740) may include an OS for controlling a resource related to an electronic device (e.g., the electronic device 701) and/or various applications (e.g., the application program 747) running on the OS. The OS may be, for example, Android, iOS, Windows, Symbian, Tizen, or the like.

The program module 910 may include a kernel 920, a middleware 930, an API 960, and/or an application 970. At least a part of the program module 910 may be preloaded on an electronic device or may be downloaded from an external electronic device (e.g., the first external electronic device 702, the second external electronic device 704, or the server 706).

The kernel 920 (e.g., the kernel 741) may include, for example, a system resource manager 921 or a device driver 923. The system resource manager 921 may perform control, allocation, or retrieval of a system resource. According to an embodiment of the present disclosure, the system resource manager 921 may include a process management unit, a memory management unit, a file system management unit, or the like. The device driver 923 may include, for example, a display driver, a camera driver, a BT driver, a shared memory driver, a USB driver, a keypad driver, a Wi-Fi driver, an audio driver, or an inter-process communication (IPC) driver.

The middleware 930, for example, may provide a function that the application 970 require in common, or may provide various functions to the application 970 through the API 960 so that the application 970 may efficiently use limited system resources in the electronic device. According to an embodiment of the present disclosure, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935 may include, for example, a library module that a complier uses to add a new function through a programming language while the application 970 is running. The runtime library 935 may perform a function for input/output management, memory management, or an arithmetic function.

The application manager 941 may mange, for example, a life cycle of at least one of the application 970. The window manager 942 may manage a GUI resource used in a screen. The multimedia manager 943 may recognize a format required for playing various media files and may encode or decode a media file using a codec matched to the format. The resource manager 944 may manage a resource such as a source code, a memory, or a storage space of at least one of the application 970.

The power manager 945, for example, may operate together with a basic input/output system (BIOS) to manage a battery or power and may provide power information required for operating the electronic device. The database manager 946 may generate, search, or modify a database to be used in at least one of the application 970. The package manager 947 may manage installation or update of an application distributed in a package file format.

The connectivity manger 948 may manage wireless connection of Wi-Fi, BT, or the like. The notification manager 949 may display or notify an event such as message arrival, appointments, and proximity alerts in such a manner as not to disturb a user. The location manager 950 may manage location information of the electronic device. The graphic manager 951 may manage a graphic effect to be provided to a user or a user interface related thereto. The security manager 952 may provide various security functions required for system security or user authentication. According to an embodiment of the present disclosure, in the case in which an electronic device (e.g., the electronic device 701) includes a phone function, the middleware 930 may further include a telephony manager for managing a voice or video call function of the electronic device.

The middleware 930 may include a middleware module for forming a combination of various functions of the above-mentioned elements. The middleware 930 may provide a module specialized for each type of an OS to provide differentiated functions. Furthermore, the middleware 930 may delete a part of existing elements or may add new elements dynamically.

The API 960 (e.g., the API 745) which is, for example, a set of API programming functions may be provided in different configurations according to an OS. For example, in the case of Android or iOS, one API set may be provided for each platform, and, in the case of Tizen, at least two API sets may be provided for each platform.

The application 970 (e.g., the application program 747), for example, may include at least one application capable of performing functions such as a home 971, a dialer 972, a short message service (SMS)/multimedia messaging service (MMS) 973, an instant message (IM) 974, a browser 975, a camera 976, an alarm 977, a contact 978, a voice dial 979, an e-mail 980, a calendar 981, a media player 982, an album 983, a clock 984, health care (e.g., measure an exercise amount or blood sugar), or environmental information provision (e.g., provide air pressure, humidity, or temperature information).

According to an embodiment of the present disclosure, the application 970 may include an information exchange application for supporting information exchange between the electronic device (e.g., the electronic device 701) and an external electronic device (e.g., the first external electronic device 702 or the second external electronic device 704). The information exchange application may include, for example, a notification relay application for relaying specific information to the external electronic device or a device management application for managing the external electronic device.

For example, the notification relay application may have a function for relaying, to an external electronic device (e.g., the first external electronic device 702 or the second external electronic device 704), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first external electronic device 702 or the second external electronic device 704) communicating with the electronic device, an application running in the external electronic device, or a service (e.g., a call service, a message service, or the like) provided from the external electronic device.

According to an embodiment of the present disclosure, the application 970 may include a specified application (e.g., a healthcare application of a mobile medical device) according to an attribute of the external electronic device (e.g., the first external electronic device 702 or the second external electronic device 704). The application 970 may include an application received from an external electronic device (e.g., the first external electronic device 702 or the second external electronic device 704). The application 970 may include a preloaded application or a third-party application downloadable from a server. The names of the elements of the program module 910 illustrated may vary with the type of an OS.

According to various embodiments of the present disclosure, at least a part of the program module 910 may be implemented with software, firmware, hardware, or a combination thereof. At least a part of the program module 910, for example, may be implemented (e.g., executed) by a processor (e.g., the processor 810). At least a part of the program module 910 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 720), the processor may perform functions corresponding to the instructions. The computer-readable storage medium may be, for example, the memory 730.

A computer-readable recording medium may include a hard disk, a floppy disk, a magnetic medium (e.g., a magnetic tape), an optical medium (e.g., compact disc-ROM (CD-ROM), DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a memory;
   a display; and
   a processor operatively connected with the memory and the display,
   wherein the memory is further configured to store instructions that, when executed, cause the processor to:
      store contents in the memory,
      display, on the display, a first screen providing a first user interface including at least one of a check box button or toggle button for selection of at least one content among a plurality of contents in the memory, the first screen including a first image on a center of the first screen,
      while the first image is being displayed, receive, using the first user interface, a first user input to select at least one content among the plurality of contents according to at least one of time information, location information, or shape information of the first image,
      set a permission to restrict at least one of edit, store, or delete of the selected at least one content in response to the first user input,
      display, on the display a second screen providing the selected at least one content, according to the set permission,
      while the second screen is displayed, receive a second user input to terminate displaying the second screen, and
      in response to the second user input, display a third screen including a second user interface for verification of a user of the electronic device on the display,
   wherein the second user input corresponds to an input to request at least one of displaying of a home screen, back screen, or screen off, and
   wherein the second screen including the first image on a center of the second screen and a plurality of thumbnails corresponding to the selected at least one content on a bottom of the second screen.

2. The electronic device of claim 1,
   wherein the at least one content includes at least one of:
      a first content having a time value set in tag information within a specified period corresponding to the first image among the plurality of contents,
      a second content having a location value set in tag information corresponding to a specified location corresponding to the first image among the plurality of contents, or
      a third content including an object with a distribution pattern of at least one of a corner point or a boundary point of the object of the first image, the distribution pattern corresponding to a specified shape, and
   wherein the instructions are further configured to cause the processor to select the third content by:
      extracting a plurality of features from the plurality of contents,
      analyzing a pattern in which the plurality of features are distributed,
      determining whether the pattern based on the distributed plurality of features corresponds to a specified shape, and
      selecting the third content when the pattern corresponds to the specified shape.

3. The electronic device of claim 1, wherein the permission to use is set to restrict at least one of edit, store, or delete of the selected at least one content.

4. The electronic device of claim 1, wherein the third screen includes a lock screen.

5. The electronic device of claim 1, wherein the memory is further configured to store instructions that, when executed, cause the processor to:
   output a fourth screen for selection of at least one other content stored in the memory except for the at least one content.

6. The electronic device of claim 5, wherein the fourth screen includes a button for deselection of the at least one content or selection of at least one other content.

7. A contents securing method of an electronic device, the method comprising:
   storing contents in a memory of the electronic device;
   displaying a first screen providing a first user interface including at least one of a check box button or a toggle button for selection of at least one content among a plurality of contents in the memory, the first screen including a first image on a center of the first screen;
   while the first image is being displayed, receiving, using the first user interface, a first user input to select at least one content among the plurality of contents stored in the memory according to at least one of time information, location information, or shape information of the first image;
   setting a permission to restrict at least one of edit, store, or delete of the selected at least one content in response to the first user input;
   displaying a second screen providing the selected at least one content according to the set permission;
   while the second screen is displayed, receiving a second user input to terminate displaying the second screen; and
   in response to the second user input, displaying a third screen including a second user interface for verification of a user of the electronic device on a display,
   wherein the second user input corresponds to an input to request at least one of displaying of a home screen, back screen, or screen off, and wherein the second screen including the first image on a center of the second screen and a plurality of thumbnails corresponding to the selected at least one content on a bottom of the second screen.

8. The method of claim 7, wherein the at least one content includes at least one of:
a first content having a time value in tag information within a specified period corresponding to the first image among the plurality of contents,
a second content having a location value set in tag information corresponding to a specified location corresponding to the first image among the plurality of contents, and
a third content including an object with a distribution pattern of at least one of a corner point and a boundary point of the object of the first image, the distribution pattern corresponding to a specified shape.

9. The method of claim 8, further comprising:
extracting a plurality of features from the plurality of contents;
analyzing a pattern in which the plurality of features are distributed;
determining whether the pattern based on the distributed plurality of features corresponds to a specified shape; and
selecting the third content when the pattern corresponds to the specified shape.

10. The method of claim 7, wherein the setting of the permission includes:
restricting at least one of edit, store, or delete of the selected at least one content.

11. The method of claim 7, wherein the third screen includes a lock screen.

12. The method of claim 7, further comprising:
outputting a fourth screen for selection of at least one other content stored in the memory except for the at least one content.

13. The method of claim 12, wherein the fourth screen includes a button for deselection of the at least one content or selection of the at least one other content.

* * * * *